US012806800B2

(12) United States Patent
Koester

(10) Patent No.: US 12,806,800 B2
(45) Date of Patent: Nov. 24, 2026

(54) MECHANICAL GRAPPLE ASSEMBLY AND METHOD FOR USING

(71) Applicant: Paladin Brands Group, Inc., New Britain, CT (US)

(72) Inventor: Jay Koester, Manchester, IA (US)

(73) Assignee: Paladin Brands Group Inc., Delhi, IA (US)

( * ) Notice: Subject to any disclaimer, the term of this patent is extended or adjusted under 35 U.S.C. 154(b) by 1176 days.

(21) Appl. No.: 17/858,546

(22) Filed: Jul. 6, 2022

(65) Prior Publication Data

US 2024/0009859 A1 Jan. 11, 2024

(51) Int. Cl.
*B25J 15/00* (2006.01)

(52) U.S. Cl.
CPC ....... *B25J 15/0028* (2013.01); *B25J 15/0033* (2013.01)

(58) Field of Classification Search
CPC ... B25J 15/0028; B25J 15/0033; B66C 1/585; B66C 1/68; E02F 3/4133
See application file for complete search history.

(56) References Cited

U.S. PATENT DOCUMENTS

| | | | |
|---|---|---|---|
| 3,820,357 A | 6/1974 | Allison | |
| 4,854,812 A | 8/1989 | Smith et al. | |
| 6,098,320 A | 8/2000 | Wass | |
| 6,267,547 B1 | 7/2001 | Lund | |
| 6,315,344 B1 | 11/2001 | Mattson et al. | |
| 6,453,586 B1 | 9/2002 | Wolin et al. | |
| 6,457,761 B1 * | 10/2002 | Benoit | B66C 1/58 294/201 |
| 6,551,051 B2 | 4/2003 | Perron et al. | |
| 6,589,007 B2 | 7/2003 | Burton | |
| 6,601,891 B1 | 8/2003 | Gregory | |
| 6,820,357 B1 | 11/2004 | Menard et al. | |
| 7,160,077 B2 | 1/2007 | Westendorf et al. | |
| 7,431,554 B2 | 10/2008 | Westendorf et al. | |
| 7,566,197 B2 | 7/2009 | Westendorf et al. | |
| 7,934,758 B2 | 5/2011 | Stamey et al. | |
| 8,146,971 B2 | 4/2012 | Lavalley et al. | |

(Continued)

FOREIGN PATENT DOCUMENTS

| | | |
|---|---|---|
| CA | 2577674 A1 | 8/2008 |
| CA | 2799776 C | 4/2014 |

(Continued)

*Primary Examiner* — Stephen A Vu
(74) *Attorney, Agent, or Firm* — Nyemaster Goode, P.C.

(57) ABSTRACT

A mechanical grapple attachment configured to be combined with a prime mover vehicle. The mechanical grapple attachment comprises a grapple assembly having a first tine pivotally combined with a second tine. As the prime mover's arms are tilted forward, the first tine moves toward the second tine. The second tine pivots in the same direction until it contacts the arm of the prime mover vehicle and is prevented from pivoting further. The first tine continues to pivot toward the second tine causing the grapple assembly to compressively grasp a load between the tines. The second tine includes a roller configured to contact the arm of the prime mover vehicle as the first tine is tilted toward the second tine. The roller helps ensure a smooth engagement between the lower tine and the arm with limited friction as the roller contacts and travels along a portion of the arm.

19 Claims, 7 Drawing Sheets

(56) References Cited

U.S. PATENT DOCUMENTS

| | | | |
|---|---|---|---|
| 8,191,950 B2 | 6/2012 | Van Amelsfoort | |
| 8,221,049 B1 | 7/2012 | Westendorf et al. | |
| 8,231,159 B2 | 7/2012 | Raihala | |
| 8,348,319 B2 | 1/2013 | Lavalley et al. | |
| 8,567,835 B2 | 10/2013 | Raihala | |
| 8,567,836 B2 | 10/2013 | Lavalley et al. | |
| 8,647,045 B1 | 2/2014 | Wagoner | |
| 8,756,837 B2 | 6/2014 | Wattel et al. | |
| 8,790,063 B2 | 7/2014 | Kim | |
| 8,834,090 B1 | 9/2014 | Callens | |
| 8,936,428 B1 | 1/2015 | Page | |
| 9,085,944 B2 | 7/2015 | Lavalley et al. | |
| 9,169,614 B2 | 10/2015 | Miller | |
| 9,439,363 B1 | 9/2016 | Selvaraj et al. | |
| 9,719,227 B2 | 8/2017 | Martin et al. | |
| 9,903,095 B2 | 2/2018 | Parker | |
| 10,066,360 B2 | 9/2018 | Burenga et al. | |
| 10,106,950 B2 | 10/2018 | Martin et al. | |
| 10,233,612 B2 | 3/2019 | Perry | |
| 10,414,633 B1 | 9/2019 | Westendorf et al. | |
| 10,584,462 B2 | 3/2020 | Burenga et al. | |
| 10,759,632 B2 | 9/2020 | Biadun | |
| 10,791,682 B2 | 10/2020 | Kitchen | |
| 10,815,100 B1 | 10/2020 | Westendorf et al. | |
| 11,142,884 B1 * | 10/2021 | Ramun | E02F 3/404 |
| 2004/0000811 A1 * | 1/2004 | Kehler | E02F 3/404<br>299/36.1 |
| 2004/0047719 A1 | 3/2004 | Helms | |
| 2006/0051193 A1 * | 3/2006 | Westendorf | B66C 1/585<br>414/729 |
| 2019/0124856 A1 | 5/2019 | Hamilton et al. | |
| 2020/0063394 A1 | 2/2020 | Weaver | |
| 2020/0157767 A1 | 5/2020 | Burenga | |
| 2020/0370273 A1 * | 11/2020 | Allen | B66F 9/20 |

FOREIGN PATENT DOCUMENTS

| | | |
|---|---|---|
| CA | 2862174 A1 | 3/2015 |
| CA | 2794141 C | 8/2017 |
| CA | 2991774 A1 | 8/2018 |
| EP | 2201209 B1 | 9/2013 |
| EP | 3393959 A1 | 10/2018 |
| WO | 0061485 A1 | 10/2000 |

* cited by examiner

MECHANICAL GRAPPLE ASSEMBLY AND METHOD FOR USING

BACKGROUND

Embodiments of the present disclosure generally relate to a grapple attachment. More particularly, embodiments of the present disclosure related to a mechanical grapple attachment that may be attached to a prime mover vehicle.

Prime mover vehicles such as excavators, tractors, skid-steers, or other machines are configured for attachment to many different types of implements. Exemplary implements include grapples, buckets, clam shells, plows, fork lifts, bale spears, and the like. Prime mover vehicles typically include a pair of hydraulically actuated lifting arms or a boom assembly (collectively referred to herein as "arms") for lifting and tilting the implements. Some implements include additional hydraulic cylinders powered by the hydraulic system of the prime mover for actuating different elements of the implement. Other implements do not have any additional hydraulic cylinders. A coupler may be used to connect the implements to the lifting arms.

A grapple attachment is a type of implement having opposing tines configured to close together to grab a load, such as a felled tree or pile of brush. Some types of grapple attachments include electric motors or hydraulic cylinders for actuating the tines between engaged and retracted positions. The motors or cylinders of the grapple attachment are powered by the systems of the prime mover vehicle. Other types of grapple attachments, generally referred to as mechanical grapples, do not have independent motors or hydraulics to move the tines relative to each other. Instead, the opposing tines on these grapple attachments open and close by tilting the implement (using the prime mover's tilt cylinders) until the lower tine contacts the lifting arms of the prime mover and cannot rotate any further. The operator continues tilting the grapple attachment causing the upper tine to rotate toward the lower tine until the two tines close around the load. One problem with mechanical grapples is that the lower tine damages the arms of the prime mover vehicle as the lower tine contacts and slides along the arms. Often the grapple attachments and the arms of the prime mover are metal causing significant friction between the components. Both components can become damaged and dented by the lower tine's contact with the arms of the prime mover vehicle.

There is therefore a need for an improved grapple attachment which overcomes these and other drawbacks in the art.

SUMMARY

One aspect of the present disclosure relates to a mechanical grapple configured to be combined with a prime mover vehicle having at least one lift arm. The grapple assembly has a first tine pivotally combined with a second tine, the first tine configured to be combined with the prime mover vehicle. A roller is rotationally combined with the second tine and configured to rotate relative to the second tine. The roller is also configured to engage the lift arm of the prime mover vehicle. The second tine further includes a forward portion, which may be a forward end, having one or more grasping teeth configured to help grasp and secure the load. Opposite the forward portion, the second tine includes a rearward portion, which may be a rearward end. The roller is combined with the rearward portion of the second tine. The first tine pivots relative to the second tine around a first axis of rotation and the roller is configured to rotate relative to the second tine around a second axis of rotation. The first axis of rotation is closer to the forward end than the second axis of rotation.

Another aspect of the present disclosure relates to a mechanical grapple configured to be combined with a prime mover vehicle. The prime mover vehicle has one or more powered arms with a coupler at one end. The coupler is configured to attach to the mechanical grapple. The arms of the prime mover are able to lift and tilt the mechanical grapple attachment between a retracted position and an engaged positioned wherein the grapple is configured to grasp a load. The mechanical grapple attachment comprises a grapple assembly having a first tine pivotally combined with a second tine. The second tine includes a roller proximate to its rear end configured to contact the arm of the prime mover vehicle as the first tine is tilted toward the second tine. The first and second tines are not powered (hydraulically or otherwise). Instead, moving the first and second tines between the retracted position and the engaged position is accomplished by the tilting action of the prime mover's arms. To move the grapple assembly to the engaged position, the arms are tilted in one direction to move the first tine toward the second tine. In the embodiment shown, the arms are tilted in a forward direction. The second tine pivots in the same direction until the roller of the second tine contacts the arm of the prime mover vehicle preventing the second tine from pivoting further. The first tine continues to pivot toward the second tine causing the grapple assembly to compressively grasp a load between the tines. Although the second tine is generally prevented from pivoting further after it contacts the arm, further tilting of the first tine toward the second tine causes the second tine to travel linearly along a portion of the arm. The roller helps ensure a smooth engagement between the second tine and the arm with limited friction as the roller contacts and travels along a portion of the arm.

Another aspect of the disclosure relates to a method of using the grapple attachment described above. The method includes attaching the mechanical grapple to the arms of the prime mover or to a coupler secured to arms of the prime mover. The grapple assembly is positioned around a load so the first tine is positioned on one side of the load and the second tine is positioned on another side of the load. The arms of the prime mover are tilted forward causing the first tine to move toward the load and toward the second tine. The second tine pivots in the same direction until the roller contacts the arm of the prime mover vehicle and is prevented from pivoting further. The first tine continues to pivot toward the second tine causing the grapple assembly to compressively grasp the load between the tines. Although the second tine is generally prevented from pivoting further after the roller contacts the arm, further tilting of the first tine toward the second tine causes the second tine to travel along a portion of the arm. The roller rolls along a portion of the arm as the grapple assembly is further tilted to ensure the load is secured between the tines. The roller helps ensure a smooth engagement between the lower tine and the arm with limited friction as the roller contacts and travels along the arm.

DETAILED DESCRIPTION

Figure 1:
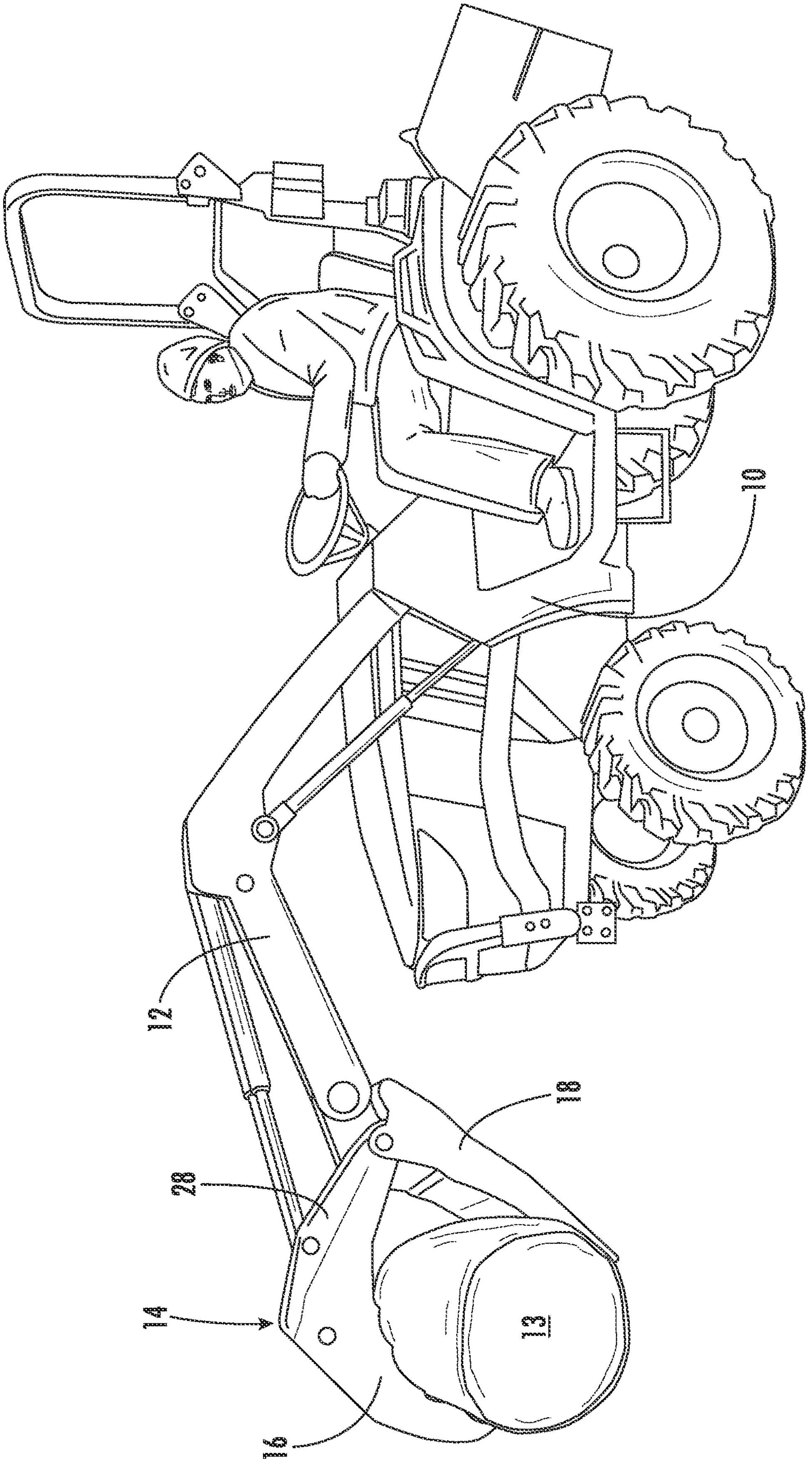
FIG. 1 is a perspective view of a mechanical grapple attachment combined with a prime mover vehicle.

FIG. 1 generally shows a mechanical grapple 14 attachment configured to be combined with a prime mover vehicle 10. The prime mover vehicle 10 has one or more lift arms 12 attached to a coupler 28 at one end. The arms 12 are powered by hydraulic cylinders, electric motors, or any other suitable means and are capable of lifting and tilting. The grapple 14 is configured to be removably attached to the coupler 28 by any suitable mounting mechanism 22 thereby allowing the arms 12 of the prime mover 10 to lift and tilt the mechanical grapple 14.

Figure 2:
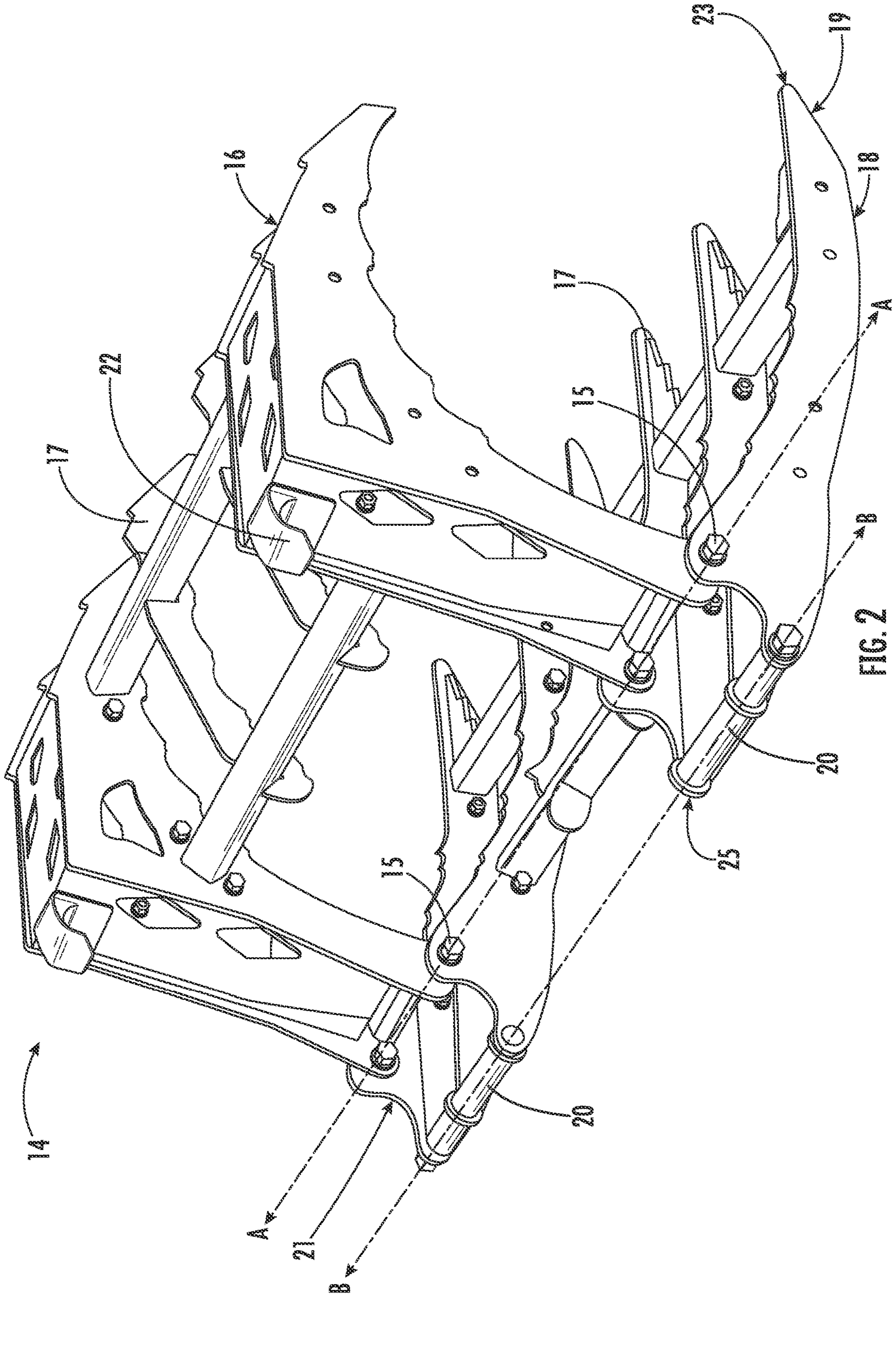
FIG. 2 is a rear perspective view of the mechanical grapple attachment.
Figure 3:
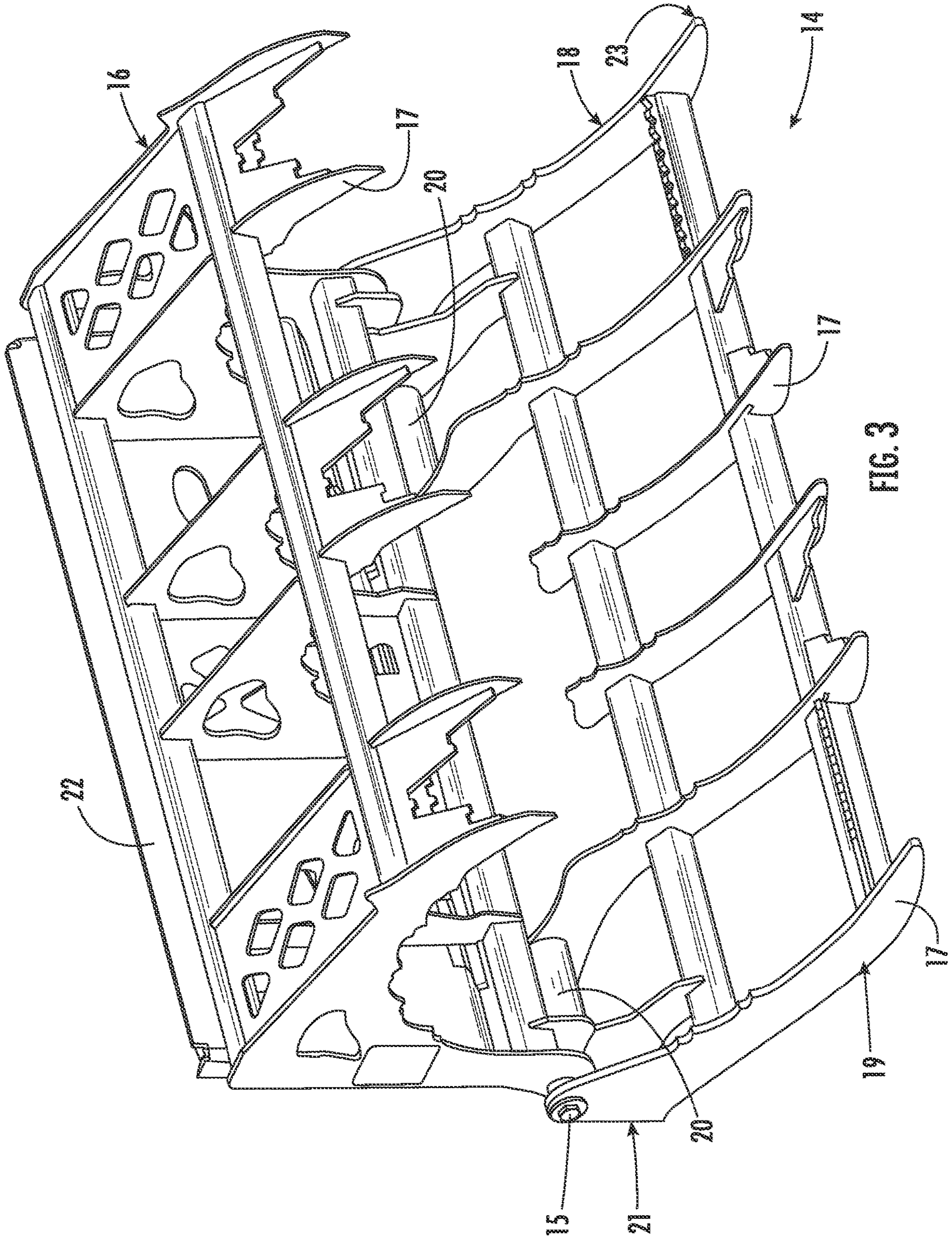
FIG. 3 is a front perspective view of the mechanical grapple attachment.

FIGS. 2 and 3 show the mechanical grapple 14. The mechanical grapple 14 comprises a grapple assembly having a first tine 16 and a second tine 18. The first tine 16 may be an upper tine and the second tine 18 may be a lower tine. It is to be understood, however, that the terms "upper" and "lower" are merely with respect to the orientations shown in the figures. Either of the first and second tines 16, 18 may be above or below the other. Indeed, the first and second tines 16, 18 may be oriented such that they open in non-vertical orientations, such that neither tine 16, 18 is above or below the other. In the embodiment shown, the first tine 16 includes a mounting mechanism 22 configured to be removably attached to the prime mover 10 or to the coupler 28. The second tine 18 is combined with the first tine 16 as described below, however, the second tine 18 is not combined with the prime mover 10 or to the coupler 28. The first tine 16 and the second tines 18 are pivotally combined with each other at one or more pivotal connections 15 to rotate or pivot along an axis of rotation A-A. The pivotal connection(s) 15 allow the first tine 16 to pivot relative to the second tine 18. When attached to the prime mover 10, the second tine 18 swings freely below the first tine 16 about the pivotal connection 15. Each of the first tine 16 and the second tine 18 may include a first portion 19 proximate the front of the assembly and a second portion 21 proximate the rear of the assembly, wherein the "rear" is the portion normally positioned closest to the prime mover 10 during normal operation. The first portion 19 may include one or more grasping teeth 17 configured to help grasp and secure the load 13. In some embodiments the first portion 19 includes a front end 23 and the second portion 21 includes a rear end 25 that is furthest from the front end 23.

Figure 4:
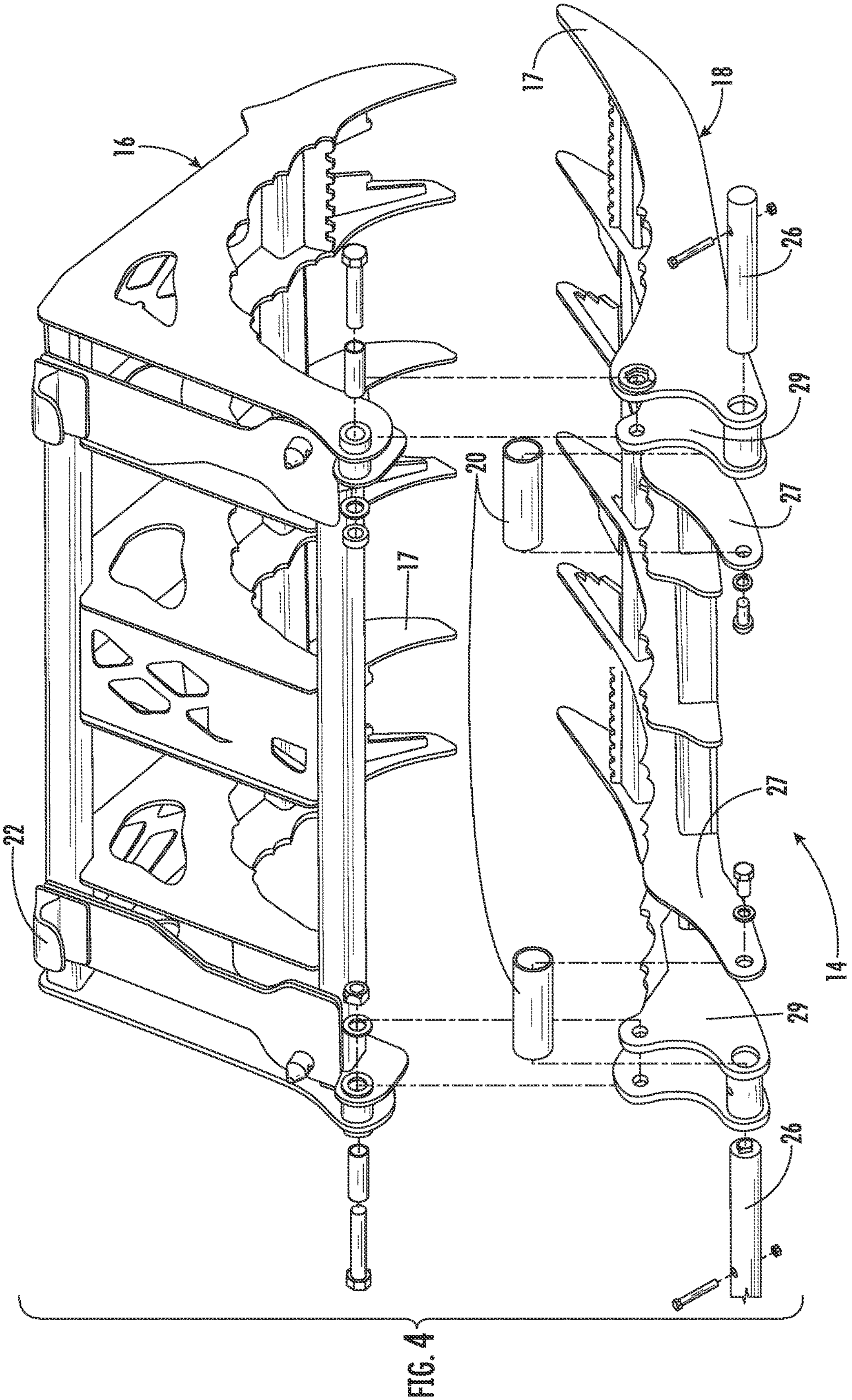
FIG. 4 is a rear exploded view of the mechanical grapple attachment.

FIG. 4 shows an exploded view of the grapple 14. As shown, the second tine 18 includes a roller 20 proximate to the second (rear) portion 21 (FIG. 2). The roller 20 is rotationally combined with the second tine 18 to spin or rotate relative to the second tine 18 around an axis of rotation B-B. In some embodiments the length of the roller 20 approximates the width of the arm 12 so to help spread the friction between the two components across the entire width of the arm 12. In some embodiments the roller 20 is longer than the width of the arm 12 to help ensure the roller 20 is the only component of the grapple 14 that contacts the arm 12. The roller 20 may be removable from the second tine 18 (by removal of pin 26) to allow replacement if the roller 20 becomes damaged. In other embodiments the roller 20 is permanently secured to the second tine 18 because pin 26 is welded in place.

Figure 5:
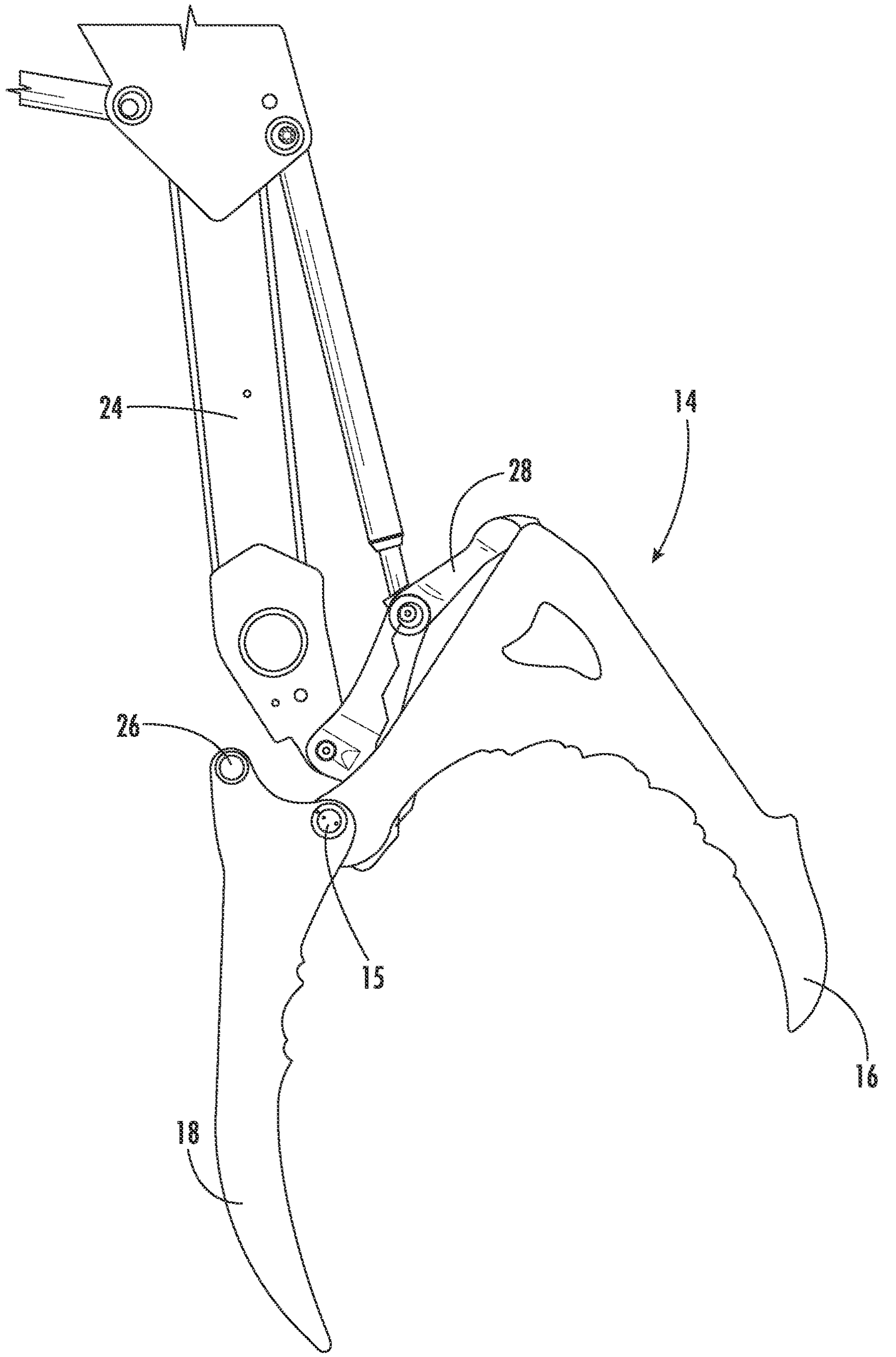
FIG. 5 is a side view of the mechanical grapple attachment in a first (retracted) position.
Figure 6:
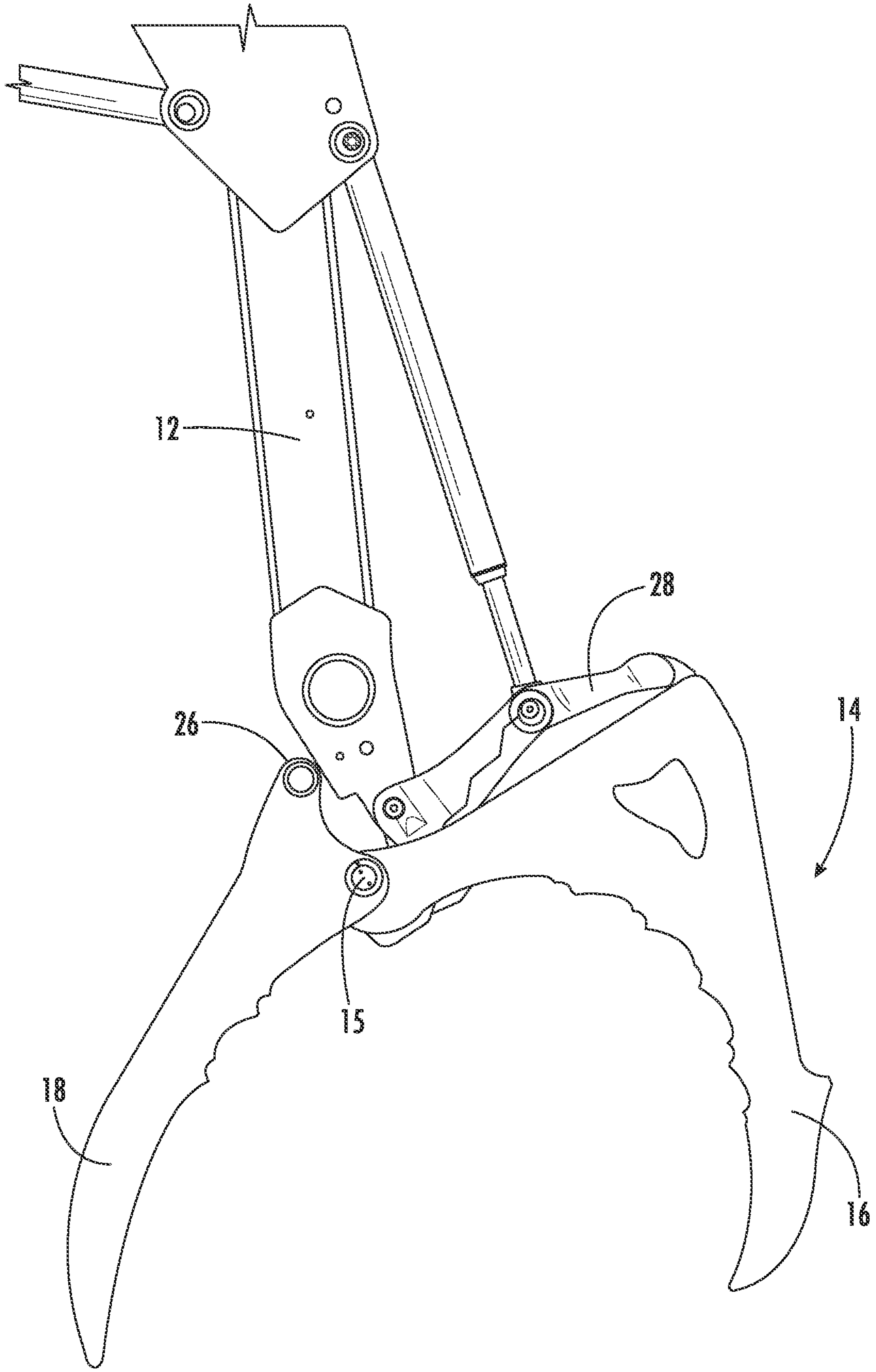
FIG. 6 is a side view of the mechanical grapple attachment in a second position.
Figure 7:
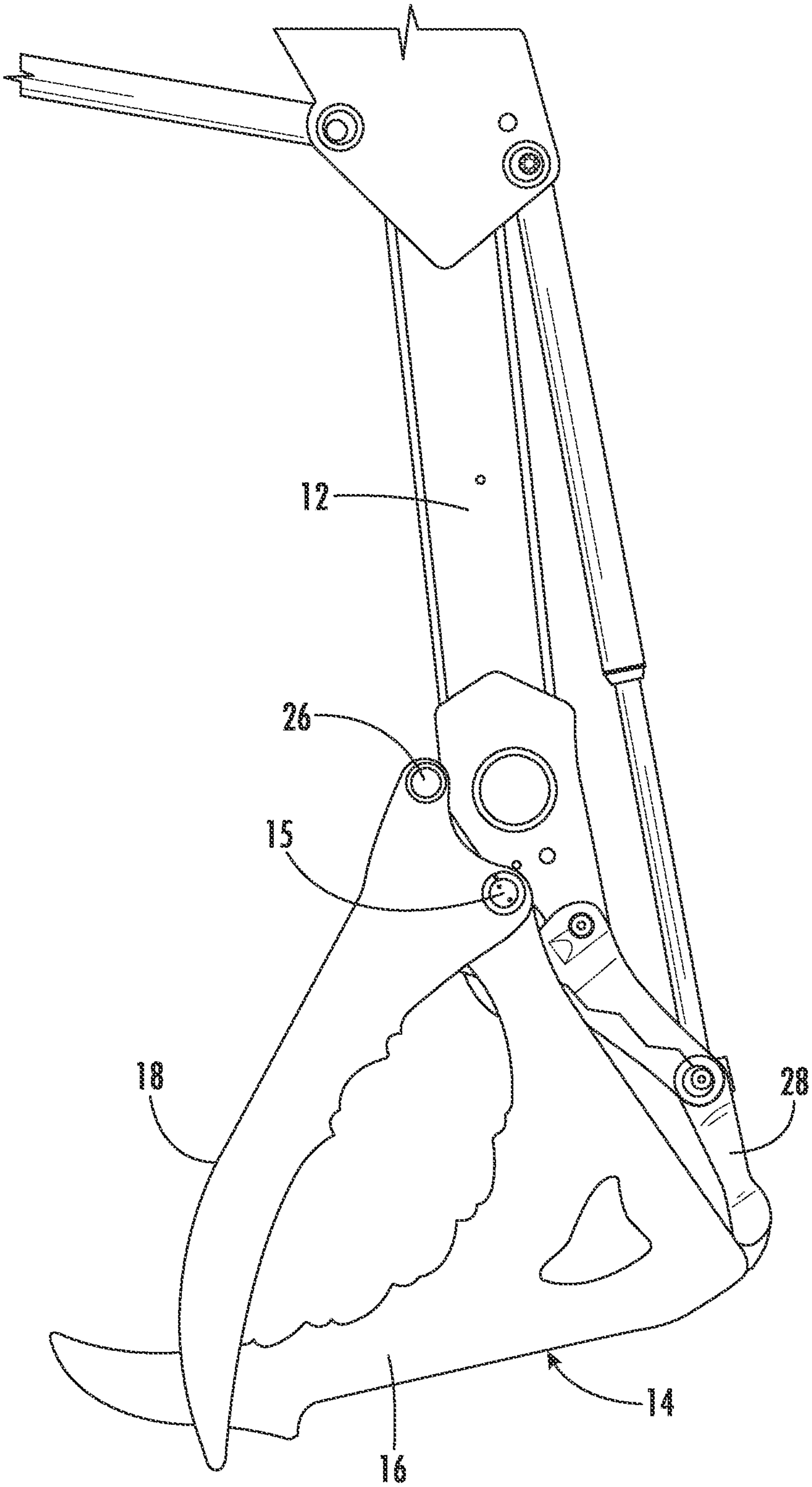
FIG. 7 is a side view of the mechanical grapple attachment in a third (engaged) position.

In the embodiment shown, the axis of rotation B-B for the roller 20 is positioned closer to the rear end 25 (FIG. 2) than the axis of rotation A-A for the pivotal connection between the tines 16, 18. The positioning helps ensure the roller 20 engages the arms 12 of the prime mover 10 instead of any other component of the grapple 14. The roller 20 is comprised of any suitable material which helps prevent abrading or galling the loader arms 12 as the roller 20 moves along the loader arm 12, including hardened steel, hard plastic, or rubber material. In one embodiment the roller 20 is made from a material different from the material of the loader arm 12 to help prevent abrading or galling the loader arms 12. In one embodiment, the second tine 18 includes a pair of support ears 27, 29 in spaced relation having a shaft 26 therebetween supported by the support ears 27, 29. The roller 20 is combined with the shaft 26 between the two ears 27, 29. The roller 20 is a generally cylindrical sleeve having an internal diameter that is larger that the outer diameter of the pin 26, thereby allowing the roller 20 to spin around the stationary shaft 26. The embodiment shown in the figures illustrates two rollers 20, one on each side for engaging the two arms 12 of a front-end loader. However, other numbers of rollers 20 may be used. For example, only one roller 20 may be used on grapple attachments used with excavators or other prime movers having only a single arm 12, FIGS. 5-7 show the sequential closing of the grapple assembly from the retracted position to the engaged position. As shown in FIG. 5, the first tine 16 is tilted away from the second tine 18 (rearward in the illustrated example) causing the tines 16, 18 to be separated from each other in a retracted position to open the grapple assembly. As the first tine 16 is tilted toward the second tine 18 (forward/clockwise in the illustrated example), the second tine 18 travels in the same direction (clockwise in the illustrated example) until the roller 20 of the second tine 18 contacts the arm 12 of the prime mover 10 (FIG. 6). Upon contact of the roller 20 with the arm 12, the second tine 18 cannot rotate any further. As shown in FIG. 7, further tilting of the grapple assembly causes the first tine 16 to continue pivoting toward the second tine 18 about the pivot axis A-A thereby closing the distance between the tines 16, 18 and grasping any load 13 between the tines 16, 18 (load 13 not shown in FIG. 7).

As shown by comparing FIGS. 6 and 7, the second tine 18 continues to have some movement relative to the arm 12 and relative to the first tine 16 even after the second tine 18 effectively stops rotating because of contact of the roller 20 with the arm 12. The continued movement is because the axis of rotation A-A of the pivotal connection 15 between the two tines 16, 18 is offset (not the same as) the axis of rotation of the pivoting connection between the first tine 16 and the coupler 28. FIG. 7 shows the roller 20 of the second tine 18 travels along the arm 12 as the first tine 16 continues to close. The roller 20 rotates as it moves along the arm 12 thereby reducing fiction between the second tine 18 and the arm 12 and helping to prevent damage to the arm 12.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. A mechanical grapple for grasping a load, the mechanical grapple configured to be combined with a prime mover vehicle having at least one lift arm, said mechanical grapple comprising:

a grapple assembly having a first tine pivotally combined with a second tine, the first tine configured to be combined with the prime mover vehicle;

a roller rotationally combined with the second tine and configured to rotate relative to the second tine, said roller configured to engage the lift arm;

wherein the second time further includes a pair of support ears in spaced relation with a shaft extending therebetween and being supported by the pair of support ears, and wherein the roller is a sleeve rotatably combined with the shaft.

2. The mechanical grapple of claim 1 wherein the first tine includes a mounting mechanism configured to be combined with a coupler on the prime mover vehicle.

3. The mechanical grapple of claim 1 wherein the second tine further includes a first portion having one or more grasping teeth configured to help grasp and secure the load and a second portion opposite the first portion, and the roller is combined with the second portion of the second tine.

4. The mechanical grapple of claim 1 wherein the second tine further includes a forward end having one or more grasping teeth configured to help grasp and secure the load and a rearward end opposite the forward end, and the roller is combined with the rearward end of the second tine.

5. The mechanical grapple of claim 4 wherein the first tine pivots relative to the second tine around a first axis of rotation and the roller is configured to rotate relative to the second tine around a second axis of rotation.

6. The mechanical grapple of claim 5 wherein the first axis of rotation is closer to the forward end than the second axis of rotation.

7. The mechanical grapple of claim 1 wherein the roller is comprised of a hardened steel to help prevent damage to the loader arm.

8. The mechanical grapple of claim 1 wherein the roller is comprised of a first material and the loader arm is comprised of a second material, and the first material is different from the second material to help prevent damage to the loader arm.

9. A mechanical grapple configured to be combined with a prime mover vehicle having at least one lift arm, said mechanical grapple comprising:

a grapple assembly having a first tine pivotally combined with a second tine, the first tine configured to be combined with the prime mover vehicle;

wherein the first tine and the second tine each include a forward portion opposite a rearward portion, the forward portion having one or more teeth configured to help grasp a load;

wherein the lower tine further includes a pair of support ears proximate the second portion, the pair of support ears in spaced relation with each other and having a shaft extending therebetween and being supported by the pair of support ears; and a roller rotationally combined with the second tine to spin relative to the second tine, said roller configured to engage the lift arm.

10. The mechanical grapple of claim 9 wherein the first portion is a first end and the second portion is a second end.

11. The mechanical grapple of claim 9 wherein the first tine pivots relative to the second tine around a first axis of rotation and the roller is configured to rotate relative to the second tine around a second axis of rotation.

12. The mechanical grapple of claim 11 wherein the first axis of rotation is closer to the forward portion than the second axis of rotation.

13. The mechanical grapple of claim 9 wherein the roller is comprised of a hardened steel to help prevent damage to the loader arm.

14. The mechanical grapple of claim 9 wherein the roller is comprised of a first material and the loader arm is comprised of a second material, and the first material is different from the second material to help prevent damage to the loader arm.

15. A method of using a mechanical grapple comprising:

taking a mechanical grapple with a grapple assembly having a first tine pivotally combined with a second tine, wherein the second tine is rotationally combined with a roller configured to spin relative to the second tine;

attaching the first tine to a prime mover vehicle having a lift arm;

positioning the first tine on one side of a load and the second tine on another side of the load;

tilting the lift arm to move the first tine toward the second tine until the roller contacts the lift arm;

continuing to tilt the lift arm causing the roller to move along a length of the lift arm until the load is grasped between the first tine and the second tine;

wherein the second tine further includes a pair of support ears in spaced relation with a shaft extending therebetween and being supported by the pair of support ears and wherein the roller is a sleeve rotatably combined with the shaft.

16. The method of claim 15 further comprising moving the grapple assembly to a retracted position to release the load by moving the first tine away from the second tine.

17. The method of claim 15 wherein the second tine further includes a forward end having one or more grasping teeth configured to help grasp and secure the load and a rearward end opposite the forward end, and the roller is combined with the rearward end of the second tine.

18. The method of claim 17 further comprising pivoting the first tine relative to the second tine around a first axis of rotation and rotating the roller relative to the second tine around a second axis of rotation, wherein the first axis of rotation is closer to the forward end than the second axis of rotation.

19. The method of claim 15 further comprising removing the shaft from the support ears, removing the roller from the shaft, placing a second roller on the shaft, and combining the shaft with the support ears.

* * * * *